(12) United States Patent
Tohzaka et al.

(10) Patent No.: US 9,008,017 B2
(45) Date of Patent: Apr. 14, 2015

(54) WIRELESS COMMUNICATION DEVICE AND WIRELESS COMMUNICATION SYSTEM

(75) Inventors: Yuji Tohzaka, Kawasaki (JP); Hiroki Mori, Kawasaki (JP); Tsuguhide Aoki, Kawasaki (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 13/526,042

(22) Filed: Jun. 18, 2012

(65) Prior Publication Data

US 2013/0070694 A1     Mar. 21, 2013

(30) Foreign Application Priority Data

Sep. 16, 2011   (JP) ................................ 2011-202956

(51) Int. Cl.
*H04W 72/08* (2009.01)

(52) U.S. Cl.
CPC ..................................... *H04W 72/08* (2013.01)

(58) Field of Classification Search
CPC .................................................. H04W 72/08
USPC ........................................................ 370/329
See application file for complete search history.

(56) References Cited

U.S. PATENT DOCUMENTS

| | | | |
|---|---|---|---|
| 2006/0046738 A1* | 3/2006 | Guan et al. | 455/452.2 |
| 2007/0201400 A1* | 8/2007 | Kang et al. | 370/329 |
| 2010/0111036 A1* | 5/2010 | Iwamura | 370/331 |
| 2011/0058543 A1 | 3/2011 | Komine et al. | |
| 2012/0302272 A1* | 11/2012 | Hakola et al. | 455/509 |
| 2012/0322486 A1 | 12/2012 | Kameno et al. | |
| 2013/0083672 A1* | 4/2013 | Johansson et al. | 370/252 |

FOREIGN PATENT DOCUMENTS

| | | |
|---|---|---|
| CN | 101854726 A | 10/2010 |
| EP | 2237630 A2 * | 10/2010 |
| JP | 2008-271321 A | 11/2008 |
| JP | 2010-246112 A | 10/2010 |
| JP | 2011-061295 A | 3/2011 |
| WO | WO 2011/108637 A1 | 9/2011 |

OTHER PUBLICATIONS

Japanese Office Action dated Jul. 2, 2013 (and English translation thereof) in counterpart Japanese Application No. 2011-202956.

(Continued)

*Primary Examiner* — Charles C Jiang
*Assistant Examiner* — Thad Defauw
(74) *Attorney, Agent, or Firm* — Holtz, Holtz, Goodman & Chick PC

(57) ABSTRACT

According to one embodiment, an allocating unit of a wireless communication device finds for each user an unallocated radio channel having maximum communication quality as a first radio channel, and calculates a first metric matching a communication state using communication quality in the first radio channel, selects one user from the plurality of users based on the first metric and allocates the first radio channel to the selected user. Further, the allocating unit repeats allocating an unallocated radio channel adjacent to a radio channel allocated to the selected user on a frequency domain until predetermined conditions are satisfied.

14 Claims, 7 Drawing Sheets

(56) References Cited

OTHER PUBLICATIONS

Japanese Office Action dated Feb. 28, 2014 (and English translation thereof) in counterpart Japanese Application No. 2011-202956.

Chinese Office Action dated Oct. 10, 2014, issued in counterpart Chinese Application No. 201210252441.1.

Japanese Office Action dated Jul. 11, 2014 in counterpart Japanese Application No. 2011-202956.

* cited by examiner

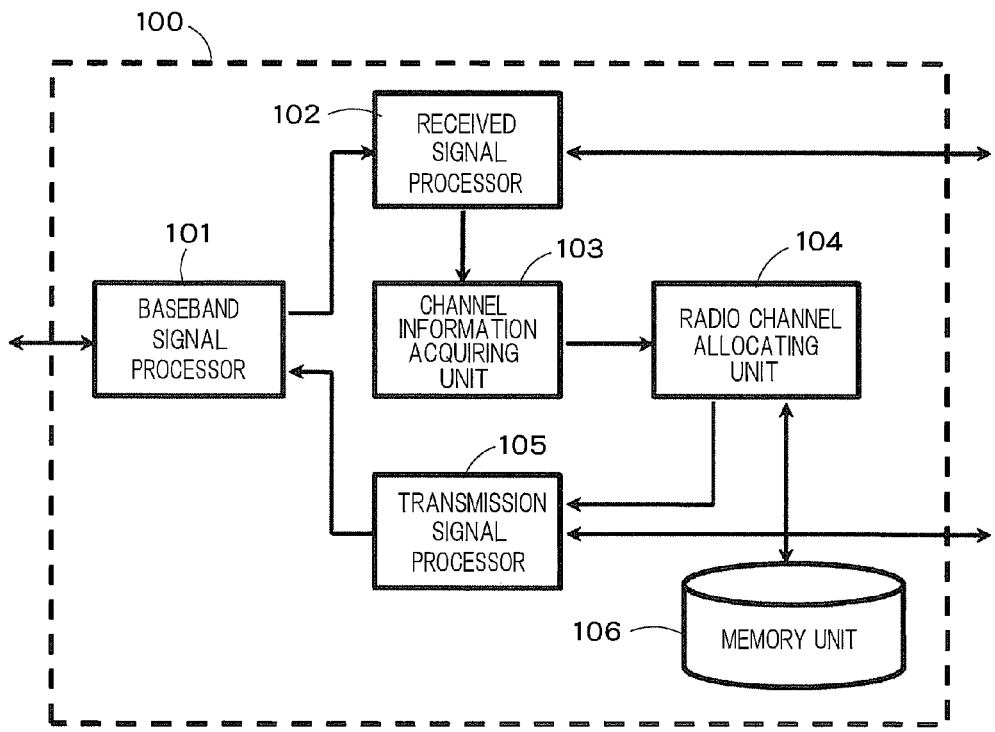
F I G. 6
| MCS NUMBER | REQUIRED SNR VALUE [dB] |
|---|---|
| 0 | -5 |
| 1 | -3 |
| ... | ... |
| M | 20 |
F I G. 7

| MCS NUMBER | NUMBER OF RADIO CHANNELS | | | |
|---|---|---|---|---|
| | 1 | 2 | ... | N |
| 0 | 100[bit] | ... | ... | ... |
| 1 | ... | ... | ... | ... |
| ... | ... | ... | ... | ... |
| M | ... | ... | ... | 10000[bit] |

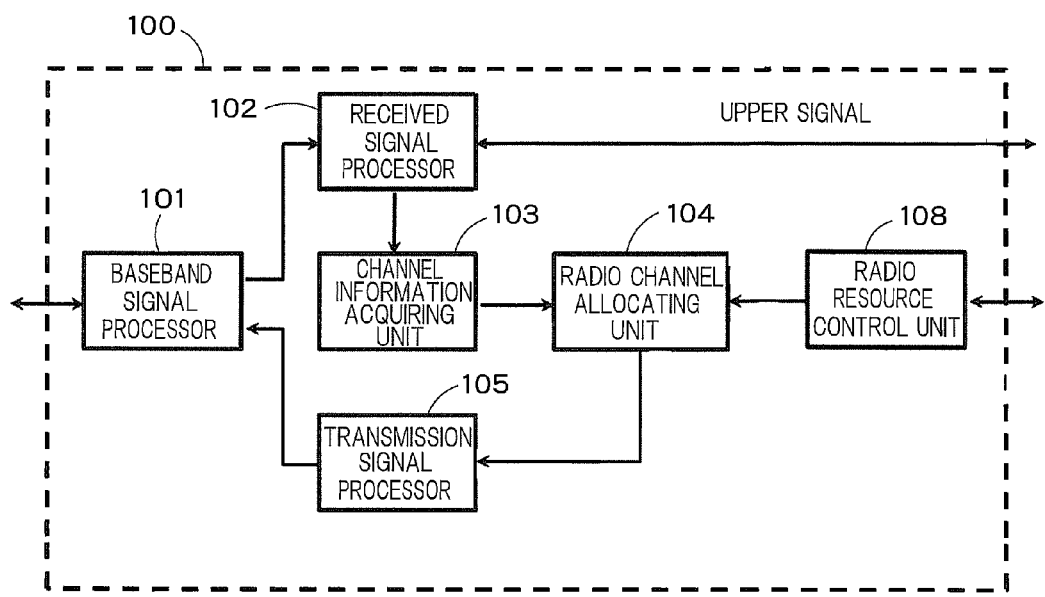
F I G. 10
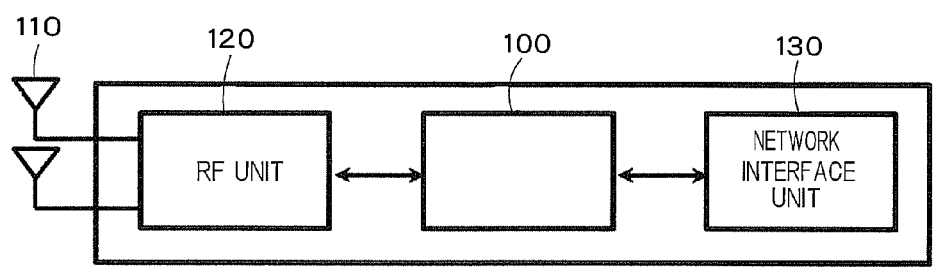
F I G. 11

WIRELESS COMMUNICATION DEVICE AND WIRELESS COMMUNICATION SYSTEM

CROSS REFERENCE TO RELATED APPLICATIONS

This application is based upon and claims the benefit of priority from the prior Japanese Patent Application No. 2011-202956, filed on Sep. 16, 2011, the entire contents of which are incorporated herein by reference.

FIELD

Embodiments described herein relate generally to a wireless communication device and a wireless communication system.

BACKGROUND

Single carrier transmission is an effective method of reducing the peak-to-average power ratio in a power amplifier, and performing communication with highly efficient power. A single-carrier frequency division multiple access (SC-FDMA) method can provide a multiple access to a plurality of users of the single carrier transmission on a frequency domain in multiple-user environment, such as a cellular system, and improve a frequency use efficiency based on a multi-user diversity effect.

With SC-FDMA, it is necessary to allocate continuous radio channels on the frequency domain to allocate radio channels to users who perform communication by way of single carrier transmission. A conventional radio channel allocating method has a problem in which a computation amount becomes enormous according to the number of radio channel groups. Further, there is a problem in which one user is likely to occupy all bands, and therefore it is difficult to obtain the multi-user diversity effect.

BRIEF DESCRIPTION OF THE DRAWINGS

FIG. 6 is a schematic configuration diagram of a wireless communication device according to a second embodiment of the present invention;

FIG. 7 is a view illustrating an example of a table stored in a memory unit according to the second embodiment;

FIG. 10 is a schematic configuration diagram of a wireless communication device according to a fourth embodiment of the present invention;

FIG. 11 is a schematic configuration diagram of a wireless communication system having the wireless communication device according to one of the first to fourth embodiments of the present invention;

DETAILED DESCRIPTION

According to one embodiment, an allocating unit of a wireless communication device finds for each user an unallocated radio channel having maximum communication quality as a first radio channel, and calculates a first metric matching a communication state using communication quality in the first radio channel, selects one user from the plurality of users based on the first metric and allocates the first radio channel to the selected user. Further, the allocating unit repeats allocating an unallocated radio channel adjacent to a radio channel allocated to the selected user on a frequency domain until predetermined conditions are satisfied.

Embodiments will now be explained with reference to the accompanying drawings.

(First Embodiment)

Figure 1:
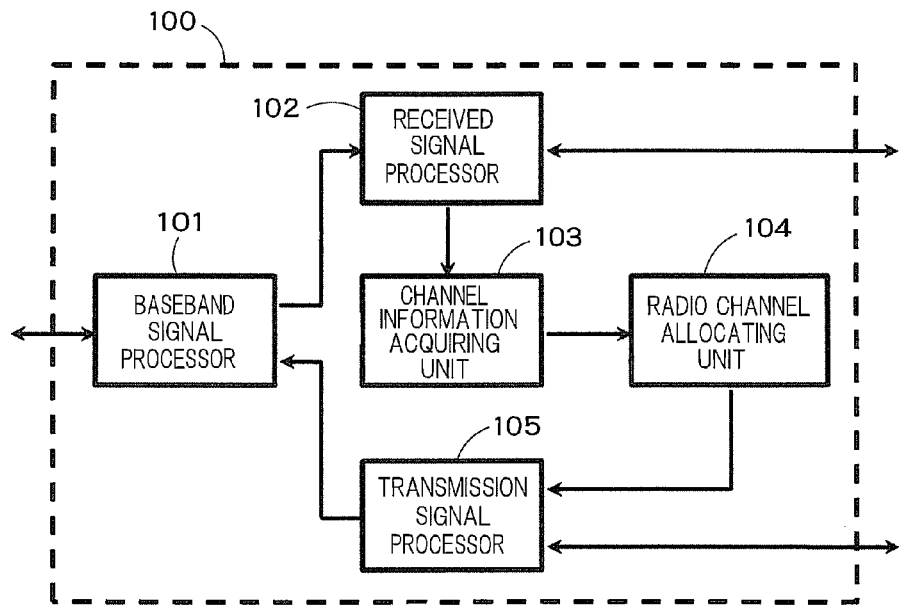
FIG. 1 is a schematic configuration diagram of a wireless communication device according to a first embodiment of the present invention.

FIG. 1 is a schematic configuration of a wireless communication device according to a first embodiment of the present invention. As illustrated in FIG. 1, a wireless communication device 100 has a baseband signal processor 101, a received signal processor 102, a channel information acquiring unit 103, a radio channel allocating unit 104 and a transmission signal processor 105.

The baseband signal processor 101 estimates a frequency, estimates a symbol timing, estimates a phase and decides a symbol upon reception of a signal, and reports a demodulation symbol to the received signal processor 102. Further, the baseband signal processor 101 maps symbols and forms pulses upon transmission of signals.

The received signal processor 102 performs DFT (Discrete Fourier Transform), subcarrier mapping, channel equalization, IDFT (Inverse DFT), demodulation, descrambling and decoding of a demodulated symbol reported from the baseband signal processor 101 to separate signals. The received signal processor 102 separates a signal and extracts a reference signal, and reports the reference signal to the channel information acquiring unit 103.

The channel information acquiring unit 103 acquires each radio channel quality information of each user, based on the reference signal reported from the received signal processor 102. The radio channel quality information may be one of SINR (Signal to Interference and Noise Ratio), SNR (Signal to Noise Ratio), RSRP (Reference Signal Received Power) or RSSI (Reference Signal Strength Indicator), or may be other indicators representing channel quality. Further, after grouping a plurality of continuous radio channels into a radio channel group, the above processing may be performed for the radio channel group. In the following description, radio channels can also be treated as a radio channel group. The channel information acquiring unit 103 reports the acquired radio channel quality information of each user to the radio channel allocating unit 104.

The radio channel allocating unit 104 determines a radio channel to allocate to a user, using radio channel quality information reported from the channel information acquiring unit 103. A radio channel allocating method will be described later. The radio channel allocating unit 104 reports a radio channel allocation result to the transmission signal processor 105.

The transmission signal processor 105 forms a control information signal based on the allocation result reported from the radio channel allocating unit 104. The control information signal shows which radio channel is allocated to the user. For example, the allocation result is reported by use of a starting position of the allocated radio channels and the number of the allocated radio channels. The transmission signal processor 105 performs encoding, scrambling, modulation, layer mapping, precoding, subcarrier mapping and IFFT (Inverse Fast Fourier Transform) of the control information signal and outputs the control information signal to the baseband signal processor 101 as a transmission signal.

Figure 2:
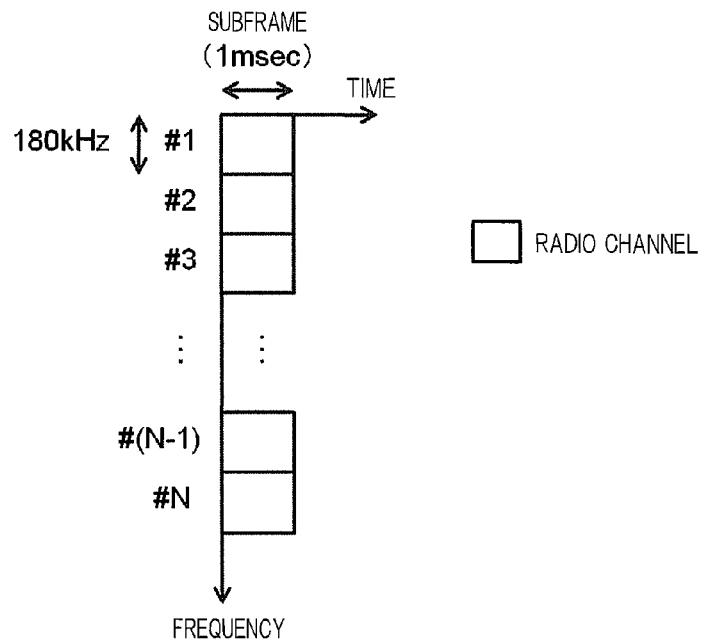
FIG. 2 is a view illustrating an example of a radio channel.

Next, the radio channel allocating method will be described. FIG. 2 illustrates an example of the radio channel.

FIG. 2 illustrates a radio channel of 3GPP LTE (Long Term Evolution). With 3GPP LTE, a resource partitioned by the frequency of 180 kHz bandwidth and a subframe time length of 1 msec has a minimum radio channel size which can be allocated to a user, and there are N (N is an integer equal to or more than 2) radio channels in the frequency direction. The radio channels may be grouped into a plurality of groups adjacent in the frequency domain and, in this case, the radio channels can be regarded as a radio channel group in the following description.

Radio channel allocation processing by the radio channel allocating unit 104 will be described using a flowchart illustrated in FIG. 3. In addition, for radio channel allocation, it is assumed that there are one or more unallocated radio channels and one or more selection candidates. An unallocated radio channel is a radio channel which is not yet allocated to any user. A selection candidate is one or more users who are radio channel allocation candidates.

(Step S101) Which radio channel of unallocated radio channels has maximum (best) quality is found for each selection candidate based on quality information acquired by the channel information acquiring unit 103. Hereinafter, an unallocated radio channel having maximum quality for each selection candidate is referred to as a "first radio channel".

Further, a metric of each selection candidate is calculated using the maximum quality in the first radio channel. A metric may be the maximum quality itself, or a combination of the maximum quality and the past data transmission amount based on a proportional fairness criterion. The metric may be a past transmission amount or a transmission occasion.

Alternatively, a transmission amount C calculated from radio channel quality as a Shannon capacity may be treated as a metric according to the following equation 1.

$$C = \alpha \cdot B \cdot \log_2(1+\gamma) \text{ [bit/sec]} \qquad \text{[Equation 1]}$$

In equation 1, $\alpha$ represents a correction coefficient, B represents a frequency bandwidth and $\gamma$ represents SNR or SINR. An upper limit or a lower limit of the transmission amount C may be provided according to a system.

Further, a combination of a plurality of the above elements may be treated as a metric.

A metric calculated for each selection candidate in this step S101 and matching a communication state is referred to as the "first metric".

(Step S102) One user is selected from the selection candidates based on the first metric for each user found in step S101. For example, in step S101, when the first metric is maximum quality, a user having the maximum quality is selected. Alternatively, the maximum quality which is combined with the past data transmission amount based on the proportional fairness criterion is treated as the first metric, a user having the maximum combination value is selected.

When, for example, the first metric is set to be a past transmission amount or a transmission occasion, a user having a minimum combination value is selected. When the first metric is set to be the transmission amount C calculated according to equation 1, a user having the maximum transmission amount C is selected.

Moreover, a first radio channel which is a radio channel having the maximum quality for the selected user is allocated to the selected user.

(Step S103) Whether or not radio channels adjacent to a radio channel allocated to the selected user on the frequency domain are unallocated radio channels is checked. Here, a radio channel allocated to the selected user includes the first radio channel.

When the adjacent radio channels are unallocated radio channels, the step proceeds to step S104.

Meanwhile, when the adjacent radio channels are not unallocated radio channels, the step proceeds to S108. In this case, the user selected in step S102 is excluded from the selection candidates.

(Step S104) A metric matching a communication state in a radio channel allocated to the user is calculated for the selected as a second metric. A second metric may be a transmission amount (refer to equation 1) calculated from, for example, radio channel quality and the number of allocation radio channels. In this case, the radio channel quality may be an average of each radio channel quality when the number of allocated radio channels is two or more, or may be calculated using a method such as EESM (Effective Exponential SNR Mapping) as in the following equation 2 or MIESM (Mutual Information ESM) to determine an effective value having statistical nature.

$$\gamma_{\textit{eff}} = EESM(\gamma, \beta) = -\beta \ln \frac{1}{n} \sum_{i=1}^{n} \exp\left(\frac{-\gamma_i}{\beta}\right) \qquad \text{[Equation 2]}$$

With equation 2, $\gamma_{\textit{eff}}$ represents effective SNR or SINR, $\gamma_i$ represents SNR or SINR of a radio channel i and n represents the number of allocation radio channels. By adjusting, in advance, a coefficient such as $\beta$ of EESM in equation 2 according to a system in a calculation of finding these effective radio channel qualities, it is possible to estimate the radio channel quality close to an actual radio channel quality.

When the number of unallocated radio channels adjacent to the radio channel allocated to the selected user is one, this unallocated radio channel is used for the second radio channel. Further, when the number of unallocated radio channels adjacent to the radio channels allocated to the selected user is plural, a radio channel having maximum quality among these unallocated channels is used for the second radio channel. Furthermore, a metric when this second radio channel is allocated to the selected user is calculated as a third metric. The third metric is calculated according to the same method as that of the second metric.

(Step S105) The second metric and the third metric calculated in step S104 are compared.

When the third metric is greater than the second metric, that is, when throughput is improved by allocating the second radio channel to the selected user, the step proceeds to step S106.

Meanwhile, when the third metric is not greater than the second metric, that is, when throughput is not improved even if the second radio channel is allocated to the selected user, the step proceeds to step S108. For example, if the second radio channel quality of which is not good so much is allocated, a modulation method applicable to the selected user changes, and the throughput could be decreased. When the step proceeds to step S108, the user selected in step S102 is excluded from the selection candidates.

(Step S106) The second radio channel is allocated to the selected user. In this case, by storing the third metric as a new second metric, it is possible to reduce the computation amount to additionally allocate a radio channel next time or thereafter.

(Step S107) When the transmission amount estimated from the radio channel allocated to the selected user satisfies a required transmission amount, radio channel allocation for the user is finished to proceed to step S108. Further, when the number of radio channels allocated to the selected user reaches the default maximum number of allocation radio channels of the system per user, the radio channel allocation for the user may be finished to proceed to step S108. The maximum number of the allocation radio channels per user may be determined based on the number of accommodated users (the number of selection candidate users). When the step proceeds to step S108, the user selected in step S102 is excluded from the selection candidates.

Meanwhile, when the transmission amount estimated from a radio channel allocated to the selected user does not satisfy the required transmission amount, the step returns to S103 to perform the radio channel allocation processing again.

(Step S108) When there are other selection candidate users and unallocated radio channels, the step returns to step S101 to calculate the first metric for each selection candidate and continue the radio channel allocation processing.

When at least one of other selection candidate users and unallocated radio channels are not present, the radio channel allocation processing is finished. Further, even when the number of users to which radio channels are allocated reaches the default maximum number of selected users in the system, the radio channel allocation processing may be finished.

Figure 4:
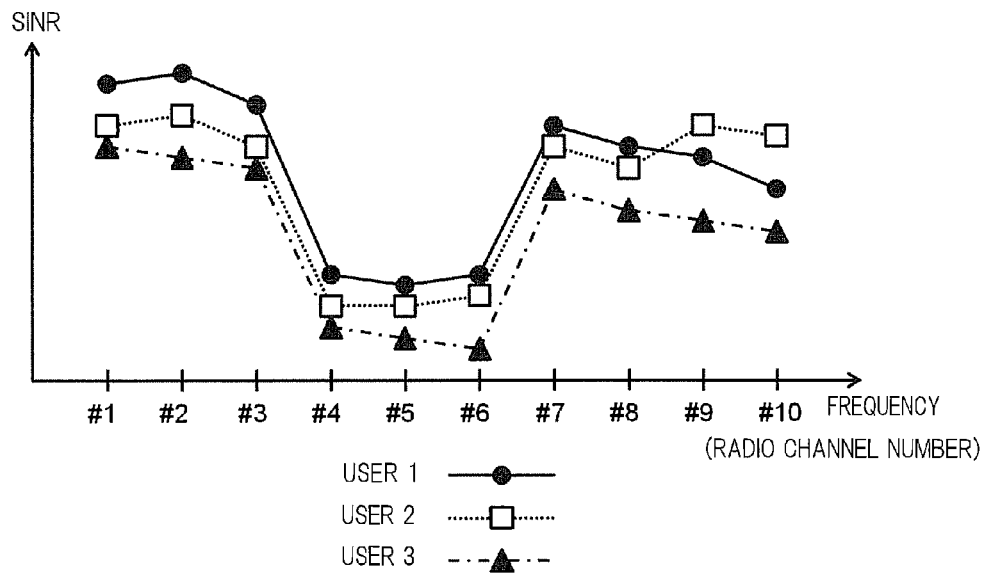
FIG. 4 is a graph illustrating an example of SINR of each radio channel.

Next, an example of the radio channel allocation processing will be described using FIG. 4. With this example, radio channels #1 to #10 are allocated to users 1 to 3. FIG. 4 illustrates SINR in each radio channel of each user. All radio channels are not allocated yet upon start of a channel allocation, and radio channels allocated to each user need to be continuous at all times on the frequency domain.

First, the first radio channel which provides the maximum SINR for each user is found, and the first metric is calculated for this first radio channel. Meanwhile, the first metric is SINR. The radio channel #2 is the first radio channel for the user 1 and the user 2, and the radio channel #1 is the first radio channel for the user 3.

Next, the user 1 who is the user of the maximum first metric is selected, and the radio channel #2 which is the first radio channel is allocated to the user 1.

The radio channels #1 and #3 adjacent to the radio channel #2 are not yet allocated. SINR of the radio channel #1 is higher than SINR of the radio channel #3 for the user 1, and therefore the radio channel #1 is the second radio channel.

Further, the transmission amount when the radio channel #1 which is the second radio channel is not allocated to the user 1, that is, when only the radio channel #2 is allocated, is calculated as the second metric. Furthermore, the transmission amount when the radio channel #1 which is the second radio channel is allocated to the user 1, that is, when the radio channels #1 and #2 are allocated, is calculated as the third metric.

Then, the second metric and the third metric are compared. With this example, it is assumed that the third metric is greater than the second metric. That is, the transmission amount increases following an increase in the number of radio channels allocated to the user 1. Hence, the radio channel #1 which is the second radio channel is allocated to the user 1.

Further, with this example, even if the radio channel #1 is allocated to the user 1, a required transmission amount of the user 1 is not satisfied, and radio channel allocation for the user 1 is continued.

An unallocated radio channel adjacent to the radio channels #1 and #2 which have been allocated to the user 1 is only the radio channel #3. Hence, the radio channel #3 is a new second radio channel.

The transmission amount when the radio channel #3 which is the second radio channel is not allocated to the user 1, that is, when the radio channels #1 and #2 are allocated, is calculated as the second metric. In addition, the transmission amount is calculated as the third metric when deciding whether or not to allocate the radio channel #1, and therefore it is possible to cancel computation and reduce the calculation amount by using the calculation result.

Further, the transmission amount when the radio channel #3 which is the second radio channel is allocated to the user 1, that is, when the radio channel #3 is allocated in addition to the radio channels #1 and #2, is calculated as the third metric.

With this example, assuming that the third metric is greater than the second metric, the radio channel #3 is allocated to the user 1. Further, it is assumed that a required transmission amount of the user 1 is not satisfied even if the radio channel #3 is allocated to the user 1, and the radio allocation for the user 1 is continued. At this point of time, the radio channels #1, #2 and #3 are allocated to the user 1.

An unallocated radio channel adjacent to the radio channels which have been allocated to the user 1 is only the radio channel #4. Hence, the radio channel #4 is a new second radio channel.

Then, the transmission amount when the radio channel #4 is not allocated to the user 1, that is, when the radio channels #1 to #3 are allocated, is calculated as the second metric. In addition, the transmission amount is calculated as the third metric when deciding whether or not to allocate the radio channel #3, and therefore it is possible to cancel computation by using the calculation result.

Further, the transmission amount when the radio channel #4 is allocated to the user 1, that is, when the radio channel #4 is allocated in addition to the radio channels #1 to #3, is calculated as the third metric.

With this example, the radio channel #4 has quality significantly lower than that of the radio channel which has been allocated to the user 1, and the third metric becomes smaller than the second metric. Hence, the radio channel allocation for the user 1 is finished without allocating the radio channel #4, which is the second radio channel, to the user 1, and the user 1 is excluded from the selection candidates.

At this point of time, there are unallocated radio channels #4 to #10, and the user 2 and the user 3 as the selection candidates. Hence, the radio channel allocation processing is continued.

The first radio channel which provides the maximum SINR for each selection candidate (user 2 and user 3) is found, and the first metric is calculated for this first radio channel. The first metric is SINR. The radio channel #9 is the first radio channel for the user 2, and the radio channel #7 is the first radio channel for the user 3.

Next, the user 2 who is the user of the maximum first metric is selected, and the radio channel #9 which is the first radio channel is allocated to the user 2.

Similar to the user 1, radio channels are allocated from unallocated radio channels to the user 2 in descending order of the SINR. Although processing will not be described in detail, radio channels #10, #8 and #7 will be allocated in this order subsequent to the radio channel #9 without satisfying the required transmission amount. In a situation where the transmission amount decreases if the radio channel #6 is allocated to the user 2, radio channel allocation for the user 2 is finished and the user 2 is excluded from the selection candidates.

At this point of time, the radio channels #1 to #3 are allocated to the user 1, and the radio channels #7 to #10 are allocated to the user 2. Further, there are unallocated radio channels #4 to #6, and there is a user 3 as a selection candidate. Hence, the radio channel allocation processing is continued.

The first radio channel which provides the maximum SINR for the user 3 is the radio channel #4. Hence, the radio channel #4 is allocated to the user 3. Similar to the user 1 and the user 2, radio channels are also allocated from unallocated radio channels to the user 3 in descending order of the SINR. When the radio channel #5 is allocated to the user 3, it is regarded that a required transmission amount of the user 3 is satisfied. Then, radio channel allocation for the user 3 is finished, and the user 3 is excluded from the selection candidates.

At this point of time, although there is the radio channel #6 which is an unallocated radio channel, there is no selection candidate user, and therefore the radio channel allocation processing is finished.

As a result, the radio channels #1 to #3 are allocated to the user 1, the radio channels #7 to #10 are allocated to the user 2 and the radio channels #4 and #5 are allocated to the user 3. Radio channels which are continuous on the frequency domain are allocated to all users.

Thus, with the present embodiment, when the radio channels which are continuous on the frequency domain are allocated to one user (steps S103 to S107 in FIG. 3), it is possible to suppress the computation amount by using the calculated metric again. Further, it is possible to allocate the radio channels, which are continuous on the frequency domain, to each user.

Consequently, according to the present embodiment, it is possible to suppress the computation amount and allocate the radio channels to the users such that a multi-user diversity effect can be obtained.

(Comparison of Characteristics Between the First Embodiment and Comparison Example According to Calculator Simulation)

To show an effect resulting from a radio channel allocating method according to the first embodiment of the present invention, the first embodiment and the comparison example are evaluated and compared according to calculator simulation.

Evaluation conditions include 10 MHz of the frequency bandwidth (the number of radio channels is 50), regular hexagonal 7 cell wrap around environment, 500 m of an inter-base station distance, a uniformly-distributed user arrangement, 1 user transmission antenna, 23 dBm of user maximum transmission power, 30 km/h of the user moving speed, 4 base station receiving antennas, base station MMSE reception and a full buffer traffic model. The proportional fair criterion is employed for a user selection metric.

The radio channel allocating method according to the comparison examples includes performing a full search using a combination of radio channels which are continuous with respect to unallocated radio channels as a radio channel group, calculating the metric of the proportional fair protocol per combination of all radio channel groups and all unselected users, and allocating the radio channels included in the radio channel group, to users in descending order of the metric value.

Figure 5:
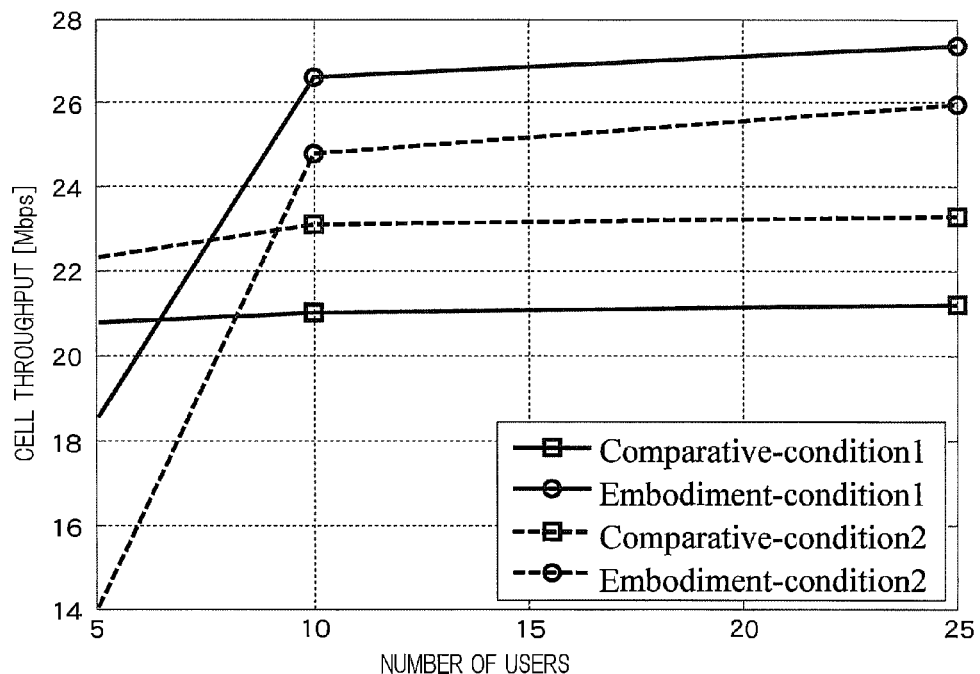
FIG. 5 is a graph illustrating an example of a relationship between the number of users and cell throughput.

FIG. 5 illustrates cell throughput with respect to the number of users per cell. In FIG. 5, "Comparative" corresponds to a radio channel allocating method according to the comparison examples, and "Embodiment" corresponds to a radio channel allocating method according to the present embodiment. While a plurality of continuous radio channels are likely to be allocated at once with the method according to the comparison examples, radio channels are allocated one by one with the method according to the present embodiment.

Further, a "condition 1" shows that a channel allocation is started from a state where all 50 radio channels are not yet allocated, and a "condition 2" shows that a radio channel allocation is started from a state where up to 5 radio channels among the 50 radio channels are already allocated at random. With the "condition 2", starting channel allocation from a state where a traffic of high real time performance is allocated the most preferentially is simulated in a simplified manner, and this corresponds to the third embodiment described below.

FIG. 5 illustrates that it is possible to significantly improve characteristics in a situation where there are a large number of users with the radio channel allocating method according to the present embodiment.

(Second Embodiment)

FIG. 6 is a configuration diagram of a wireless communication device according to a second embodiment of the present invention. The present embodiment differs from the first embodiment illustrated in FIG. 1 in including a memory unit 106. In FIG. 6, the same components as those in the first embodiment illustrated in FIG. 1 will be assigned the same reference numerals and description of the components will not be repeated.

The memory unit 106 stores a table which defines a radio channel quality required to select each MCS (Modulation and Coding Scheme). The radio channel quality defined in the table may be, for example, SNR as illustrated in FIG. 7, or may be a value representing other channel qualities such as SINR and RSSI.

A radio channel quality value required for each MCS is set in advance to satisfy a required error rate. The error rate refers to BLER (Block Error Rate), PER (Packet Error Rate) or BER (Bit Error Rate).

Figures 8, 9:
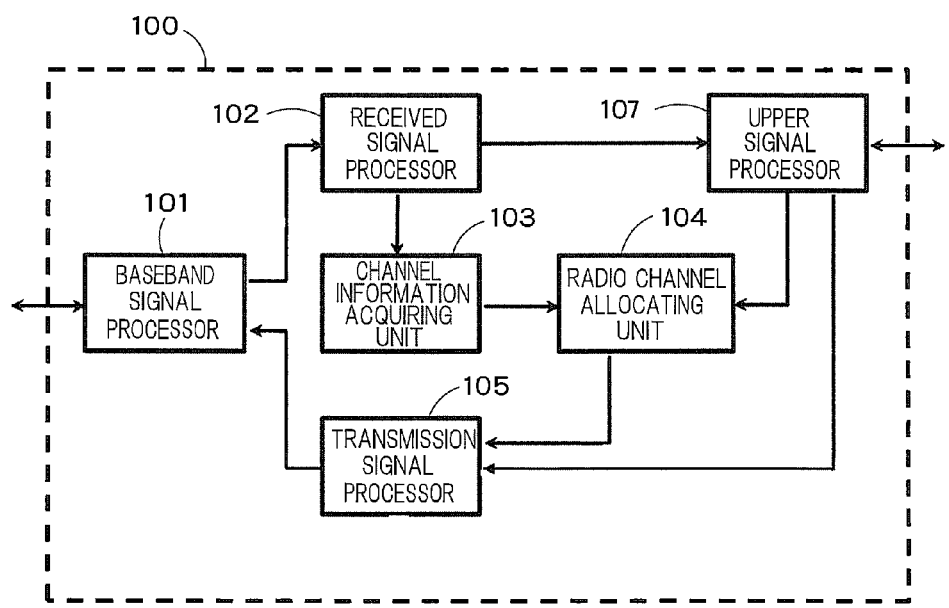
FIG. 8 is a view illustrating an example of a table stored in the memory unit according to the second embodiment.
FIG. 9 is a schematic configuration diagram of a wireless communication device according to a third embodiment of the present invention.

Further, the memory unit 106 may further store a table which defines information of a data size which can be transmitted for a combination of the MCS and the number of radio channels as illustrated in FIG. 8. In this case, when receiving an input of the radio channel quality value and the number of radio channels from the radio channel allocating unit 104, the memory unit 106 finds an applicable MCS number from the table illustrated in FIG. 7 based on the radio channel quality value, finds the data size which can be transmitted from the table illustrated in FIG. 8 based on the number of radio channels and the MCS number, and outputs the data size to the radio channel allocating unit 104.

Figure 3:
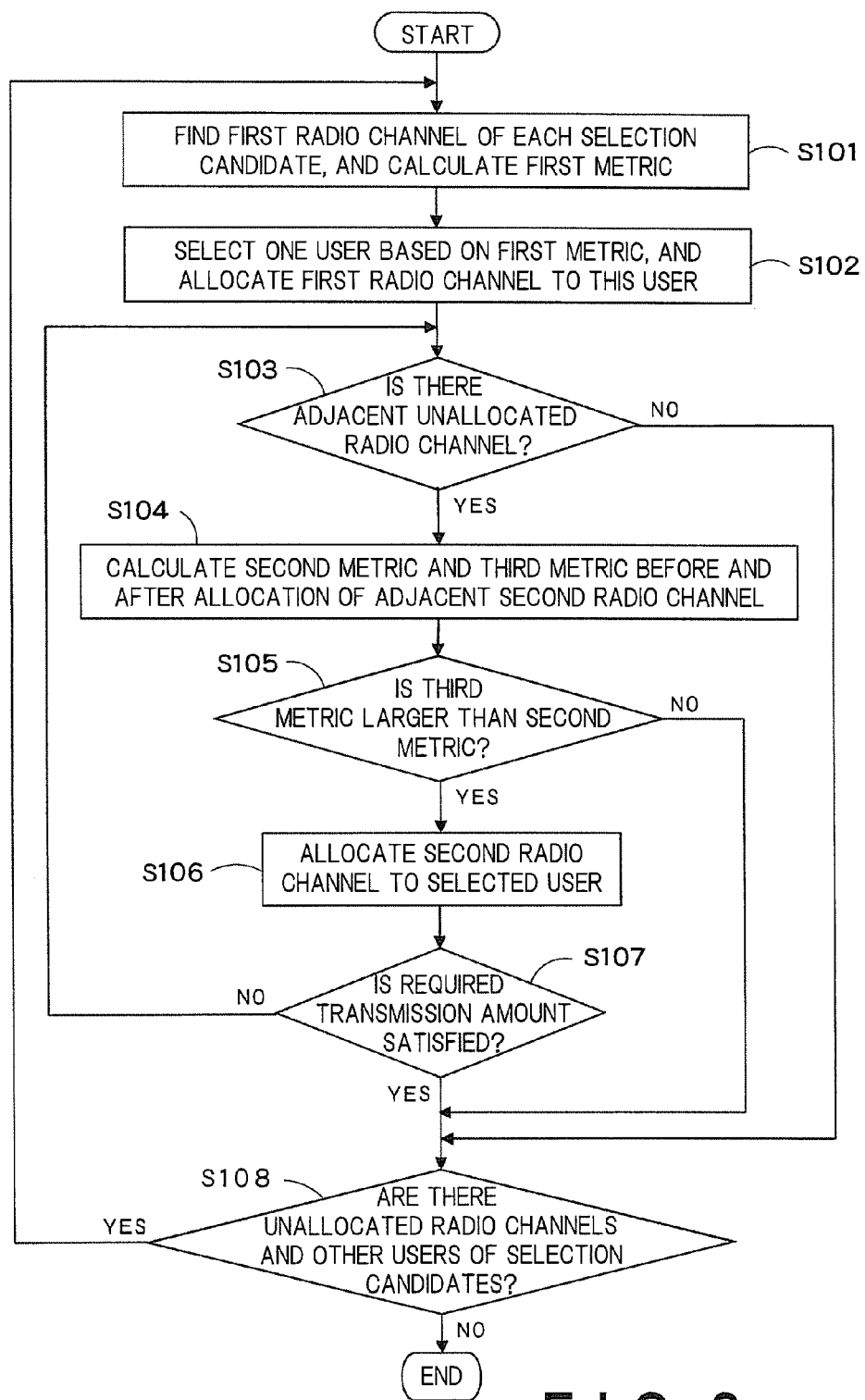
FIG. 3 is a flowchart for explaining a wireless communication method according to the first embodiment.

The radio channel allocating method according to the present embodiment differs from the first embodiment illustrated in FIG. 3 in calculation of the metric in step S101 and step S104.

With the present embodiment, the first metric calculated in step S101 is the transmission amount calculated from the frequency use efficiency and a coding rate of the applicable MCS, or a data size which can be transmitted directly from the table of the memory unit 106. In this case, in step S102, the user having the maximum first metric is selected.

The second metric and the third metric calculated in step S104 are treated as the transmission amount obtained from the table of the memory unit 106.

By referring to the table of the memory unit 106, it is possible to estimate a more practical transmission amount. Consequently, it is possible to further improve the frequency use efficiency by the radio channel allocation processing according to the present embodiment.

(Third Embodiment)

FIG. 9 is a configuration diagram of a wireless communication device according to a third embodiment of the present invention. The present embodiment differs from the first embodiment illustrated in FIG. 1 in including an upper signal processor 107. In FIG. 9, the same components as those in the first embodiment illustrated in FIG. 1 will be assigned the same reference numerals and description of the components will not be repeated.

The upper signal processor 107 manages QoS (Quality of Service) of each user or each buffer, and is aware of required transmission amount information of each user. The upper signal processor 107 reports a traffic which needs to be allocated the most preferentially, to the radio channel allocating unit 104 based on the required transmission amount information of each user. The radio channel allocating unit 104 allocates a specified radio channel to a specified user irrespectively of a state of the radio channel when the traffic which needs to be allocated the most preferentially is reported from the upper signal processor 107. The traffic which needs to be allocated the most preferentially includes, for example, VoIP (Voice over Internet Protocol) for which high real time performance is requested, or retransmission data which is transmitted in a specified radio channel at a determined timing. The upper signal processor 107 may have a function of retransmission control upon transmission and reception.

The radio channel allocating method according to the present embodiment differs from the first embodiment illustrated in FIG. 3 in allocating a radio channel based on the traffic which is reported from the upper signal processor 107 and needs to be allocated the most preferentially before the metric is calculated in step S101.

Further, the first metric calculated in step S101 may be a required transmission amount of each user which the radio channel allocating unit 104 acquires from the upper signal processor 107. Following a comparison between this required transmission amount and the transmission amount C found according to Equation 1, whichever is smaller may be regarded as the practical transmission amount and, accordingly, be treated as the first metric. Further, the proportional fair protocol calculated from the practical transmission amount may be the first metric.

Further, user specific QoS may be the first metric and, in this case, a user having the maximum first metric is selected in step S102.

In step S107, a predetermined required transmission amount compared with a transmission amount estimated in a radio channel allocated to the selected user is the required transmission amount which the upper signal processor 107 is aware of.

According to the present embodiment, the upper signal processor 107 manages QoS (Quality of Service) of each user and is aware of the required transmission amount, and, consequently, can allocate a required minimum number of radio channels to each user. Consequently, it is possible to further improve the frequency use efficiency.

Further, even when a channel allocation is started from a state where the traffic of high real time performance is allocated the most preferentially, it is possible to significantly improve characteristics in a situation where there are a large number of users as illustrated in FIG. 5.

(Fourth Embodiment)

FIG. 10 is a configuration diagram of a wireless communication device according to a fourth embodiment of the present invention. The present embodiment differs from the first embodiment illustrated in FIG. 1 in including a radio resource control unit 108. In FIG. 10, the same components as those in the first embodiment illustrated in FIG. 1 will be assigned the same reference numerals and description of the components will not be repeated.

The radio resource control unit 108 manages information on signal processing performance of user and transmission power, and reports the information to the radio channel allocating unit 104. The information on transmission power is, for example, an upper limit of transmission power.

A radio channel allocating method according to the present embodiment differs from that of the first embodiment illustrated in FIG. 3 in correcting radio channel quality in step S101 based on the upper limit of transmission power of each user which the radio resource control unit 108 reports to the radio channel allocating unit 104.

Upon correction of the radio channel quality based on the upper limit of transmission power, in a case where, for example, the radio channel quality is SNR ($\gamma$[dB]), this SNR is measured in a situation where the transmission power of the user does not exceed the upper limit, the number of allocation radio channels increases and, therefore, the transmission power of the user exceeds the upper limit. In such a case, a new corrected SNR ($\gamma'$[dB]) is represented by following equation.

$$\gamma' = \gamma - (P - P_{max})[dB] \quad \text{[Equation 3]}$$

Meanwhile, $P_{max}$ [dBm] represents a transmission power upper limit value, P [dBm] represents an estimated transmission power value and $P > P_{max}$ holds.

P is represented by following equation 4 using transmission power $P_0$[dBm] required to transmit one radio channel and the number of allocation radio channels n.

$$P = P_0 + 10 \log_{10}(n) + \lambda PL \text{ [dBm]} \quad \text{Equation [4]}$$

Meanwhile, $\lambda$ represents an attenuation coefficient ($0 \leq \gamma \leq 1$), and PL represents a path-loss value [dB].

Further, in step S107, when the transmission power of the user reported from the radio resource control unit 108 reaches the upper limit or the number of allocation radio channels determined based on signal processing performance reaches the maximum number, the radio channel allocation for the user may be finished.

Thus, by using the information on the signal processing performance of each user or the transmission power managed by the radio resource control unit 108, it is possible to estimate the transmission amount in accordance with the reality of the user and further improve the frequency use efficiency.

The wireless communication device 100 may have all of the memory unit 106, the upper signal processor 107 and the radio resource control unit 108 described in the second to fourth embodiments, or may have two of these. When, for example, the wireless communication device 100 has the memory unit 106 and the radio resource control unit 108, a restriction may be added based on the signal processing performance of the user reported from the radio resource control unit 108 upon selection of the MCS.

The wireless communication device 100 described in the first to fourth embodiments can be provided in a wireless communication system as illustrated in FIGS. 11 to 14.

The wireless communication system illustrated in FIG. 11 has antenna units 110, an RF unit 120, the wireless communication device 100 and a network interface unit 130. The wireless communication device 100 is connected to the RF unit 120 and the network interface unit 130.

The RF unit 120 transmits and receives radio signals through the antenna unit 110. The RF unit 120 has the same number of analog units as the number of antennas, and the analog unit includes a filter, a digital-to-analog converter, a frequency converter and a power amplifier. The RF unit 120 passes a received signal to the wireless communication device 100, and receives a transmission signal from the wireless communication device 100.

The wireless communication device 100 is connected to the network through the network interface unit 130.

Figure 12:
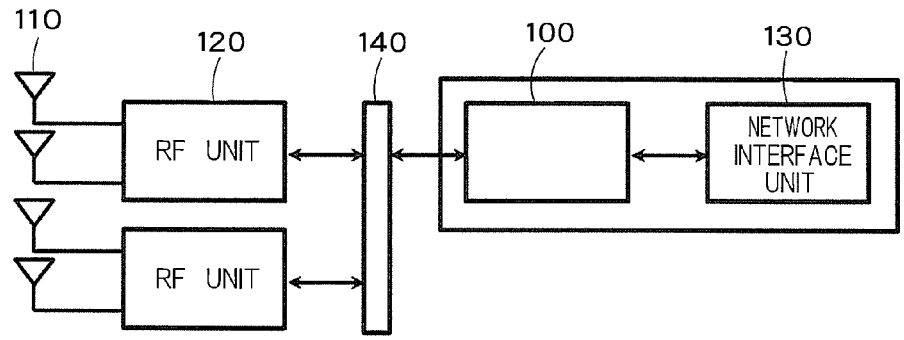
FIG. 12 is a schematic configuration diagram of a wireless communication system having the wireless communication device according to one of the first to fourth embodiments of the present invention.

The wireless communication system illustrated in FIG. 12 has a plurality of RF units 120, and a digital time signal is distributed and synthesized in a divider/combiner 140.

Figure 13:
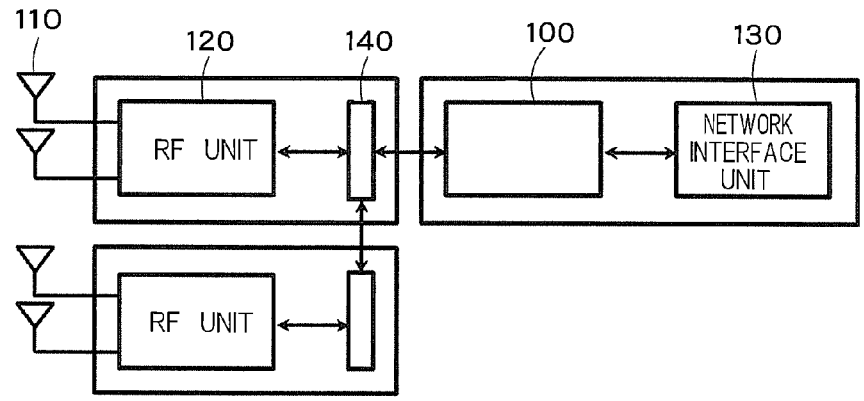
FIG. 13 is a schematic configuration diagram of a wireless communication system having the wireless communication device according to one of the first to fourth embodiments of the present invention.

The wireless communication system illustrated in FIG. 13 has plural sets of the RF unit 120 and the divider/combiner 140 contained in the same housing, and allows so-called cascade connection or star topology.

Figure 14:
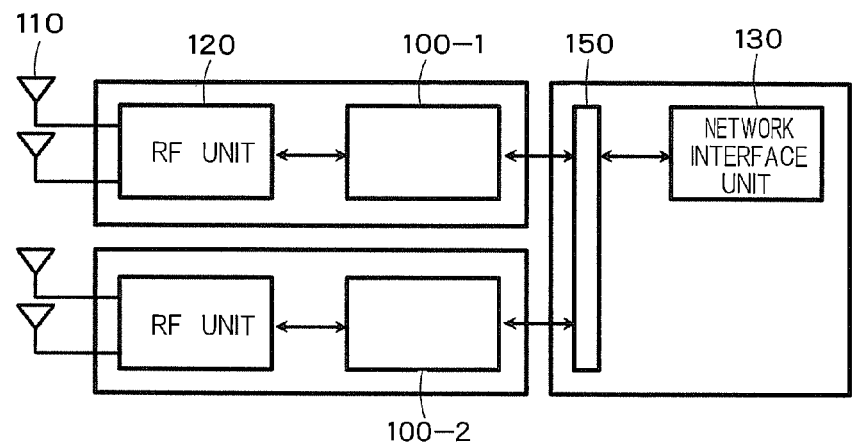
FIG. 14 is a schematic configuration diagram of a wireless communication system having the wireless communication device according to one of the first to fourth embodiments of the present invention.

The wireless communication system illustrated in FIG. 14 has plural sets of the RF unit 120 and the wireless communication devices 100 included in the same housing, and these are connected with the network interface unit 130 and a router unit 150. The router unit 150 allows communication between each of the plurality of wireless communication devices 100 and the network interface unit 130.

At least part of the wireless communication device described in the above embodiments may be implemented in either hardware or software. When implemented in software, a program that realizes at least part of functions of the wireless communication device may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the wireless communication device may be distributed through a communication line (including wireless communications) such as the Internet. Further, the program may be encrypted, modulated, or compressed to be distributed through a wired line or wireless line such as the Internet or to be distributed by storing the program on a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication device comprising:
a received signal processor which extracts reference signals from received signals from a plurality of users;
a computer configured to operate as: (i) an acquiring unit which acquires for each user communication quality values of a plurality of radio channels based on the reference signals, and (ii) an allocating unit which selects one user from the plurality of users, and which allocates to the selected user an unallocated radio channel which is a radio channel not yet allocated to any of the plurality of users;
a transmission signal processor which generates a transmission signal based on an allocation result of a radio channel by the allocating unit; and
a memory unit which stores a first table which defines a communication quality value of a radio channel required to select each Modulation and Coding Scheme, and a second table which defines information of a data size which can be transmitted, for a combination of a Modulation and Coding Scheme and a number of radio channels,
wherein the allocating unit:
finds for each of the plurality of users an unallocated radio channel comprising a maximum communication quality value as a first radio channel, and calculates a first metric matching a communication state using a communication quality value of the first radio channel;
selects one user from the plurality of users based on the first metric, and allocates the first radio channel found for the selected user to the selected user;
selects as a second radio channel an unallocated radio channel adjacent to the radio channel allocated to the selected user on a frequency domain, wherein when a number of unallocated radio channels adjacent to the radio channel allocated to the selected user on the frequency domain are plural, the allocating unit selects as the second radio channel a radio channel having a maximum communication quality value from among the plural adjacent unallocated radio channels;
calculates a second metric matching a communication state of the selected user when the second radio channel is not allocated and a third metric matching the communication state of the selected user when the second radio channel is allocated, wherein the allocating unit finds a data size of the selected user which can be transmitted, referring to the first table and the second table, for a case where the second radio channel is not allocated to the selected user and a case where the second radio channel is allocated to the selected under, and treats these found data sizes as the second metric and the third metric; and
decides, based on a comparison result of the second metric and the third metric, whether to allocate the second radio channel to the selected user or to stop allocating a radio channel to the selected user.

2. The device according to claim 1, wherein following the decision, by the allocating unit, to stop allocating the radio channel to the selected user, the allocating unit allocates an unallocated radio channel to another user among the plurality of users.

3. The device according to claim 1, wherein when a number of radio channels allocated to the selected user reaches a predetermined number, the allocating unit stops allocating the radio channel to the selected user.

4. The device according to claim 2, wherein when a number of radio channels allocated to the selected user reaches a predetermined number, the allocating unit stops allocating the radio channel to the selected user.

5. The device according to claim 1, further comprising a radio resource control unit which manages information of an upper limit of transmission power of each of the plurality of users,
wherein the allocating unit corrects the communication quality value using a number of radio channels allocated to each of the plurality of users and the upper limit of transmission power of each of the plurality of users to find the first radio channel.

6. The device according to claim 1, wherein the first metric is: (i) a transmission amount calculated from at least one of Signal to Interference and Noise Ratio, Signal to Noise Ratio, Reference Signal Received Power, Reference Signal Strength Indicator, and radio channel quality, (ii) a past transmission amount, or (iii) a past transmission occasion.

7. A wireless communication system comprising:
an RF unit which transmits and receives a radio signal through an antenna;
a wireless communication device which receives the received signal from the RF unit, and outputs the transmission signal to the RF unit; and
an interface which connects the wireless communication device to a network,
wherein the wireless communication device comprises:
a received signal processor which extracts reference signals from received signals from a plurality of users,
a computer configured to operate as: (i) an acquiring unit which acquires for each user communication quality values of a plurality of radio channels based on the reference signals, and (ii) an allocating unit which selects one user from the plurality of users, and which allocates to the selected user an unallocated radio channel which is a radio channel not yet allocated to any of the plurality of users,
a transmission signal processor which generates a transmission signal based on an allocation result of a radio channel by the allocating unit, and
a memory unit which stores a first table which defines a communication quality of a radio channel required to select each Modulation and Coding Scheme, and a second table which defines information of a data size which can be transmitted, for a combination of a Modulation an Coding Scheme and a number of radio channels,
wherein the allocating unit:
finds for each of the plurality of users an unallocated radio channel comprising a maximum communication quality value as a first radio channel, and calculates a first metric matching a communication state using a communication quality value of the first radio channel,
selects one user from the plurality of users based on the first metric, and allocates the first radio channel found for the selected user to the selected user,
selects as a second radio channel an unallocated radio channel adjacent to the radio channel allocated to the selected user on a frequency domain, wherein when a number of unallocated radio channels adjacent to the radio channel allocated to the selected user on the frequency domain are plural, the allocating unit selects as the second radio channel a radio channel having a maximum communication quality value from among the plural adjacent unallocated radio channels;
calculates a second metric matching a communication state of the selected user when the second radio channel is not allocated and a third metric matching the communication state of the selected user when the second radio channel is allocated, wherein the allocating unit finds a data size of the selected user which can be transmitted, referring to the first table and the second table, for a case where the second radio channel is not allocated to the selected user and a case where the second radio channel is allocated to the selected user, and treats these found data sizes as the second metric and the third metric, and
decides, based on a comparison result of the second metric and the third metric, whether to allocate the second radio channel to the selected user or to stop allocating a radio channel to the selected user.

8. The system according to claim 7, wherein following the decision, by the allocating unit, to stop allocating the radio channel to the selected user, the allocating unit allocates an unallocated radio channel to another user among the plurality of users.

9. The system according to claim 7, wherein when a number of radio channels allocated to the selected user reaches a predetermined number, the allocating unit stops allocating the radio channel to the selected user.

10. The system according to claim 8, wherein when a number of radio channels allocated to the selected user reaches a predetermined number, the allocating unit stops allocating the radio channel to the selected user.

11. The system according to claim 7, further comprising a radio resource control unit which manages information of an upper limit of transmission power of each of the plurality of users,
wherein the allocating unit corrects the communication quality value using a number of radio channels allocated to each of the plurality of users and the upper limit of transmission power of each of the plurality of users to find the first radio channel.

12. The system according to claim 7, wherein the first metric is: (i) a transmission amount calculated from at least one of Signal to Interference and Noise Ratio, Signal to Noise Ratio, Reference Signal Received Power, Reference Signal Strength Indicator, and radio channel quality, (ii) a past transmission amount, or (iii) a past transmission occasion.

13. The device according to claim 1, wherein the third metric is a transmission amount which is calculated from a composite value of the communication quality value of the first radio channel and a communication quality value of the second radio channel.

14. The system according to claim 7, wherein the third metric is a transmission amount which is calculated from a composite value of the communication quality value of the first radio channel and a communication quality value of the second radio channel.

* * * * *